United States Patent
Levi

(10) Patent No.: US 10,367,750 B2
(45) Date of Patent: Jul. 30, 2019

(54) TRANSMISSION AND RECEPTION OF RAW VIDEO USING SCALABLE FRAME RATE

(71) Applicant: Mellanox Technologies, Ltd., Yokneam (IL)

(72) Inventor: Dotan Levi, Kiryat Motzkin (IL)

(73) Assignee: Mellanox Technologies, Ltd., Yokneam (IL)

(*) Notice: Subject to any disclaimer, the term of this patent is extended or adjusted under 35 U.S.C. 154(b) by 0 days.

(21) Appl. No.: 15/790,075

(22) Filed: Oct. 23, 2017

(65) Prior Publication Data
US 2018/0367465 A1 Dec. 20, 2018

Related U.S. Application Data

(60) Provisional application No. 62/519,888, filed on Jun. 15, 2017.

(51) Int. Cl.
*H04L 29/06* (2006.01)
*H04L 12/891* (2013.01)
*H04L 12/801* (2013.01)

(52) U.S. Cl.
CPC ............ *H04L 47/41* (2013.01); *H04L 47/193* (2013.01); *H04L 65/602* (2013.01); *H04L 65/80* (2013.01); *H04L 69/22* (2013.01)

(58) Field of Classification Search
CPC .......... H04N 21/42615; H04N 21/434; H04N 21/4341; H04N 21/4342; H04Q 2213/036; H04Q 2213/13036; H04L 47/41; H04L 47/193; H04L 65/602; H04L 69/22
See application file for complete search history.

(56) References Cited

U.S. PATENT DOCUMENTS

| | | | |
|---|---|---|---|
| 4,783,698 A | 11/1988 | Harney | |
| 5,668,809 A | 9/1997 | Rostoker et al. | |
| 5,949,441 A | 9/1999 | Ristau | |
| 6,097,734 A | 8/2000 | Gotesman et al. | |
| 6,157,955 A | 12/2000 | Narad et al. | |
| 6,321,276 B1 | 11/2001 | Forin | |
| 6,766,467 B1 | 7/2004 | Neal et al. | |
| 6,789,143 B2 | 9/2004 | Craddock et al. | |
| 6,981,027 B1 | 12/2005 | Gallo et al. | |
| 7,171,484 B1 | 1/2007 | Krause et al. | |
| 7,263,103 B2 | 8/2007 | Kagan et al. | |

(Continued)

OTHER PUBLICATIONS

Infiniband Trade Association, "InfiniBandTM Architecture Specification", vol. 1, Release 1.2.1, 1727 pages, Nov. 2007.

(Continued)

*Primary Examiner* — Curtis A Alia
(74) *Attorney, Agent, or Firm* — Kligler & Associates

(57) ABSTRACT

An apparatus includes an input interface and transmit-side circuitry. The input interface is configured to receive a sequence of packets that carries a stream of video frames. The transmit-side circuitry is configured to divide the sequence of packets into multiple interleaved sub-sequences, wherein each sub-sequence carries a respective sub-stream of the stream of video frames, and wherein at least one of the sub-streams is self-contained and viewable independently of any other sub-stream, and to transmit the multiple sub-sequences of packets to a communication network over respective, different packet flows.

12 Claims, 3 Drawing Sheets

(56) References Cited

U.S. PATENT DOCUMENTS

| | | | |
|---|---|---|---|
| 7,298,746 | B1 | 11/2007 | De La Iglesia et al. |
| 7,299,266 | B2 | 11/2007 | Boyd et al. |
| 7,464,198 | B2 | 12/2008 | Martinez et al. |
| 7,522,606 | B1 | 4/2009 | Sendrovitz |
| 7,930,422 | B2 | 4/2011 | Freimuth et al. |
| 8,051,212 | B2 | 11/2011 | Kagan et al. |
| 8,176,252 | B1 | 5/2012 | Alexander et al. |
| 8,495,301 | B1 | 7/2013 | Alexander et al. |
| 8,638,796 | B2 | 1/2014 | Dan et al. |
| 8,682,108 | B2 | 3/2014 | Tian et al. |
| 8,751,701 | B2 | 6/2014 | Shahar et al. |
| 9,143,467 | B2 | 9/2015 | Kagan et al. |
| 9,270,299 | B2 | 2/2016 | Luby et al. |
| 9,367,746 | B2 | 6/2016 | Ishihara |
| 9,767,529 | B1 | 9/2017 | Liu et al. |
| 2002/0152327 | A1 | 10/2002 | Kagan et al. |
| 2003/0005164 | A1 | 1/2003 | Trainin |
| 2003/0046530 | A1 | 3/2003 | Poznanovic |
| 2004/0013117 | A1 | 1/2004 | Hendel et al. |
| 2004/0042483 | A1 | 3/2004 | Elzur et al. |
| 2004/0156379 | A1 | 8/2004 | Walls et al. |
| 2004/0221128 | A1 | 11/2004 | Beecroft et al. |
| 2004/0230979 | A1 | 11/2004 | Beecroft et al. |
| 2005/0135395 | A1 | 6/2005 | Fan et al. |
| 2006/0075119 | A1 | 4/2006 | Hussain et al. |
| 2007/0124378 | A1 | 5/2007 | Elzur |
| 2007/0162619 | A1 | 7/2007 | Aloni et al. |
| 2008/0109562 | A1 | 5/2008 | Ramakrishnan et al. |
| 2009/0034633 | A1 | 2/2009 | Rodriguez et al. |
| 2009/0083517 | A1 | 3/2009 | Riddle |
| 2010/0121971 | A1* | 5/2010 | Shao ............... H04N 1/00 709/231 |
| 2010/0262973 | A1 | 10/2010 | Ernst et al. |
| 2010/0274876 | A1 | 10/2010 | Kagan et al. |
| 2011/0268194 | A1 | 11/2011 | Nagano |
| 2012/0020413 | A1 | 1/2012 | Chen et al. |
| 2012/0033039 | A1 | 2/2012 | Sasaki et al. |
| 2013/0322753 | A1 | 12/2013 | Lim et al. |
| 2014/0269893 | A1 | 9/2014 | Parikh et al. |
| 2015/0063358 | A1 | 3/2015 | Wu et al. |
| 2015/0181211 | A1 | 6/2015 | He |
| 2015/0373075 | A1* | 12/2015 | Perlman ............. H04L 65/608 709/217 |
| 2016/0277473 | A1 | 9/2016 | Botsford et al. |
| 2016/0337426 | A1 | 11/2016 | Shribman et al. |

OTHER PUBLICATIONS

"MPI: A Message-Passing Interface Standard", Version 2.2, Message Passing Interface Forum, 647 pages, Sep. 4, 2009.

Shah et al., "Direct Data Placement over Reliable Transports", IETF Network Working Group, RFC 5041, 38 pages, Oct. 2007.

Culley et al., "Marker PDU Aligned Framing for TCP Specification", IETF Network Working Group, RFC 5044, 74 pages, Oct. 2007.

"Linux kernel enable the IOMMU—input/output memory management unit support", 2 pages, Oct. 15, 2007 http://www.cyberciti.biz/tips/howto-turn-on-linux-software-iommu-support.html.

Levi et al., U.S. Appl. No. 15/473,668, filed Mar. 30, 2017.

Burstein et al., U.S. Appl. No. 15/460,251, filed Mar. 16, 2017.

Gharai et al., "RTP Payload Format for Uncompressed Video", Internet Engineering Task Force, Internet-Draft,14 pages, Nov. 3, 2002.

Levi et al., U.S. Appl. No. 15/622,094, filed Jun. 14, 2017.

SMPTE Standard—"Transport of High Bit Rate Media Signals over IP Networks (HBRMT)", The Society of Motion Picture and Television Engineers, 16 pages, Oct. 9, 2012.

SMPTE Standard 2110-10:201y, "Professional Media over IP Networks: System Timing and Definitions", The Society of Motion Picture and Television Engineers, 12 pages, Jan. 26, 2017.

SMPTE Standard 2110-21:201y, "Professional Media Over IP Networks: Timing Model for Uncompressed Active Video", The Society of Motion Picture and Television Engineers, 15 pages, Jan. 18, 2017.

SMPTE Standard 2110-30:201y, "Professional Media over IP Networks—PCM Digital Audio", The Society of Motion Picture and Television Engineers, 7 pages, Jan. 26, 2017.

SMPTE Standard 2110-20:2017, "Professional Media Over Managed IP Networks: Uncompressed Active Video", The Society of Motion Picture and Television Engineers, 23 pages, Aug. 10, 2017.

International Application # PCT/IB2018/054350 search report dated Oct. 4, 2018.

U.S. Appl. No. 15/622,094 office action dated Dec. 27, 2018.

U.S. Appl. No. 15/473,668 office action dated Mar. 22, 2019.

U.S. Appl. No. 15/622,094 office action dated May 10, 2019.

Sjoberg et al., "RTP Payload Format and File Storage Format for the Adaptive Multi-Rate (AMR) and Adaptive Multi-Rate Wideband (AMR-WB) Audio Codecs", Request for Comments: 4867, pp. 1-59, Apr. 2007.

* cited by examiner

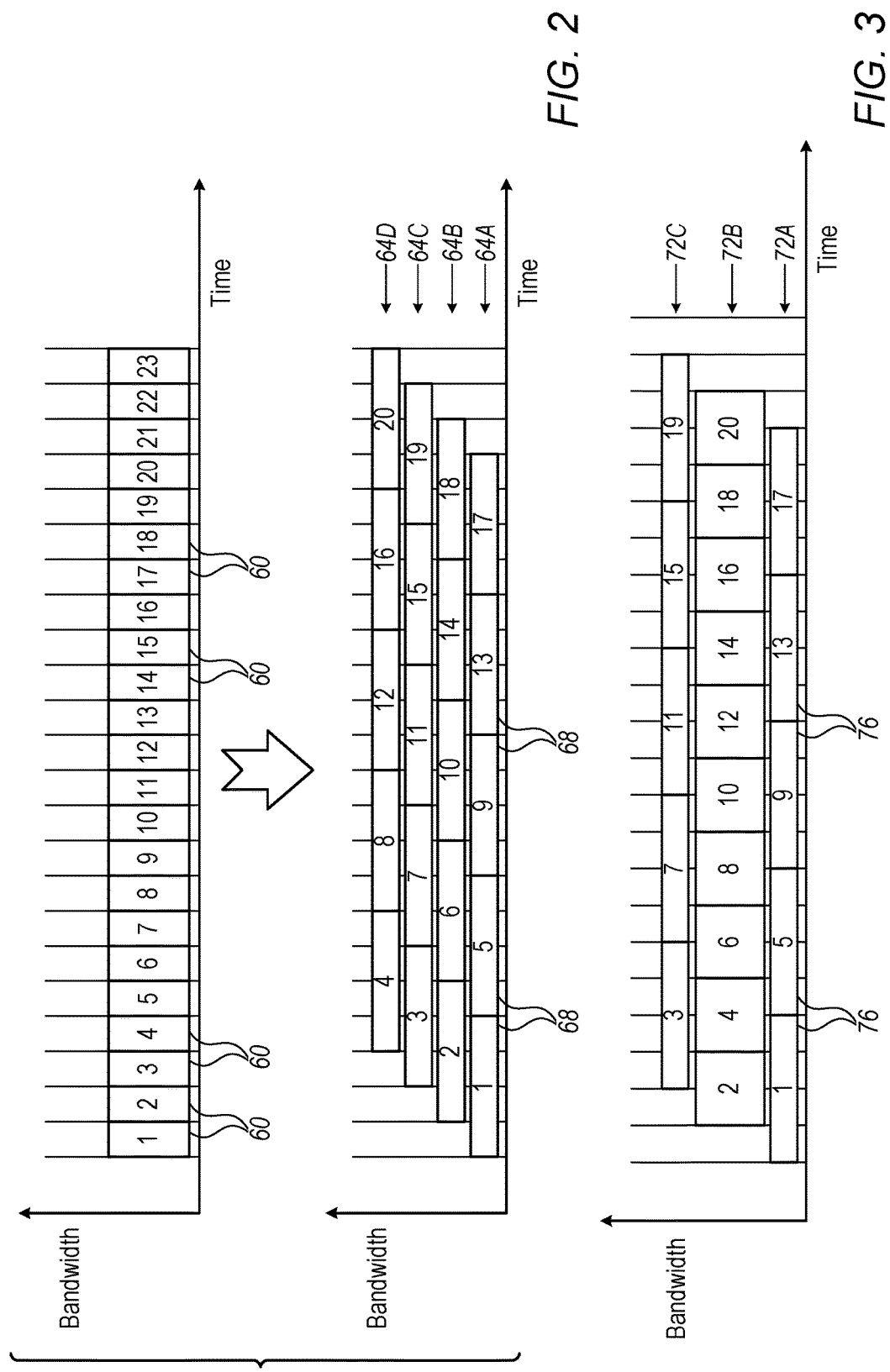

TRANSMISSION AND RECEPTION OF RAW VIDEO USING SCALABLE FRAME RATE

CROSS-REFERENCE TO RELATED APPLICATIONS

This application claims the benefit of U.S. Provisional Patent Application 62/519,888, filed Jun. 15, 2017, whose disclosure is incorporated herein by reference.

FIELD OF THE INVENTION

The present invention relates generally to communication networks, and particularly to methods and systems for transferring video over data communication networks.

BACKGROUND OF THE INVENTION

In various systems and applications, video streams are transmitted over data communication networks. Several protocols have been proposed for transporting video streams in communication packets. Some protocols, such as protocols specified by the Society of Motion Picture and Television Engineers (SMPTE), aim to standardize transmission of raw (uncompressed) video.

SUMMARY OF THE INVENTION

An embodiment of the present invention that is described herein provides an apparatus including an input interface and transmit-side circuitry. The input interface is configured to receive a sequence of packets that carries a stream of video frames. The transmit-side circuitry is configured to divide the sequence of packets into multiple interleaved sub-sequences, such that each sub-sequence carries a respective sub-stream of the stream of video frames, and such that at least one of the sub-streams is self-contained and viewable independently of any other sub-stream, and to transmit the multiple sub-sequences of packets to a communication network over respective, different packet flows.

In some embodiments, the video frames are uncompressed. In some embodiments, each of the sub-streams is self-contained and viewable independently of any other sub-stream. In some embodiments, at least one combination of two or more of the sub-streams is self-contained and viewable independently of any other sub-stream.

In an embodiment, the transmit-side circuitry is configured to divide the sequence of packets into the sub-sequences, and assign the packets to the packet flows, by inserting attributes of the packet flows in header fields of the packets. In another embodiment, the transmit-side circuitry is configured to set different frame rates to two or more of the sub-streams. In yet another embodiment, the transmit-side circuitry is configured to perform a pacing operation that reduces an instantaneous bit-rate of the sub-sequences.

There is additionally provided, in accordance with an embodiment of the present invention, an apparatus including receive-side circuitry and an output interface. The receive-side circuitry is configured to receive from a communication network multiple interleaved packet flows, which carry respective sub-sequences of a sequence of packets. The sequence of packets carries a stream of video frames, and the sub-sequences carry respective sub-streams of the stream of video frames, such that at least one of the sub-streams is self-contained and viewable independently of any other sub-stream. The receive-side circuitry is configured to merge two or more of the sub-streams to form a viewable video stream. The output interface is configured to output the viewable video stream. In some embodiments, the video frames are uncompressed.

There is also provided, in accordance with an embodiment of the present invention, a method including receiving a sequence of packets that carries a stream of video frames. The sequence of packets is divided into multiple interleaved sub-sequences, such that each sub-sequence carries a respective sub-stream of the stream of video frames, and such that at least one of the sub-streams is self-contained and viewable independently of any other sub-stream. The multiple sub-sequences of packets are transmitted to a communication network over respective, different packet flows.

There is further provided, in accordance with an embodiment of the present invention, a method including receiving from a communication network multiple interleaved packet flows, which carry respective sub-sequences of a sequence of packets. The sequence of packets carries a stream of video frames, and the sub-sequences carry respective sub-streams of the stream of video frames, such that at least one of the sub-streams is self-contained and viewable independently of any other sub-stream. Two or more of the sub-streams are merged to form a viewable video stream. The viewable video stream is provided as output.

The present invention will be more fully understood from the following detailed description of the embodiments thereof, taken together with the drawings in which:

BRIEF DESCRIPTION OF THE DRAWINGS

FIG. 2 is a diagram that schematically illustrates a video stream divided into sub-streams, in accordance with an embodiment of the present invention;

FIG. 3 is a diagram that schematically illustrates a video stream divided into sub-streams, in accordance with an alternative embodiment of the present invention.

DETAILED DESCRIPTION OF EMBODIMENTS

Overview

Embodiments of the present invention that are described herein provide improved methods and systems for transferring video streams over communication networks. The techniques described herein refer mainly to streaming of raw, i.e., uncompressed, video.

In some embodiments, a video source produces a sequence of packets that carries a stream of raw video pictures (frames or fields), for transmission over a communication network. The video source may comprise, for example, a video camera, recorder, streamer or server. Instead of transmitting the sequence of packets as-is over the network, the sequence is divided into two or more sub-sequences, and each sub-sequence is transmitted on a different packet flow. The division into sub-sequences may be performed, for example, in the video source itself, in a Network Interface Controller (NIC) that connects the video source to the network, or jointly in both.

The division into sub-sequences is performed such that each sub-sequence of packets (and thus each packet flow) carries a self-contained video stream, which is viewable independently of any other sub-stream. Each sub-stream has a lower frame rate relative to the original stream. Some sub-streams may differ from one another in frame rate. Moreover, in some embodiments, any combination of sub-streams also forms a self-contained, independently-viewable video stream.

The disclosed transmission scheme enables high efficiency and flexibility in transmitting the video stream to the network, in forwarding the video stream over the network, and in receiving and extracting the video frames at the receiving end.

For example, in a video broadcast application, different receivers may select different sub-streams, or different combinations of sub-streams, to match their bandwidth or processing capabilities. As another example, network switches will typically handle multiple narrowband flows better than a single broadband flow. The former configuration will typically require, for example, less buffer space. Splitting a video stream into multiple flows also enables a more efficient use of the network's transport layer.

As yet another example, separate packet flows may be forwarded over different ports, and may be processed separately by network elements. The bandwidth of a single broadband video stream, by contrast, may exceed the capacity of a single port. Multiple separate flows also lend themselves to parallel processing at the receive-side network adapter, e.g., using different Central Processing Unit (CPU) cores.

Moreover, the disclosed technique does not require modification in any of the network elements. The network elements, and in some cases even the receivers, need not be aware that the different packet flows carry different sub-streams of the same video stream. Several example implementations and system configurations that utilize the disclosed technique are described below.

System Description

Figure 1:
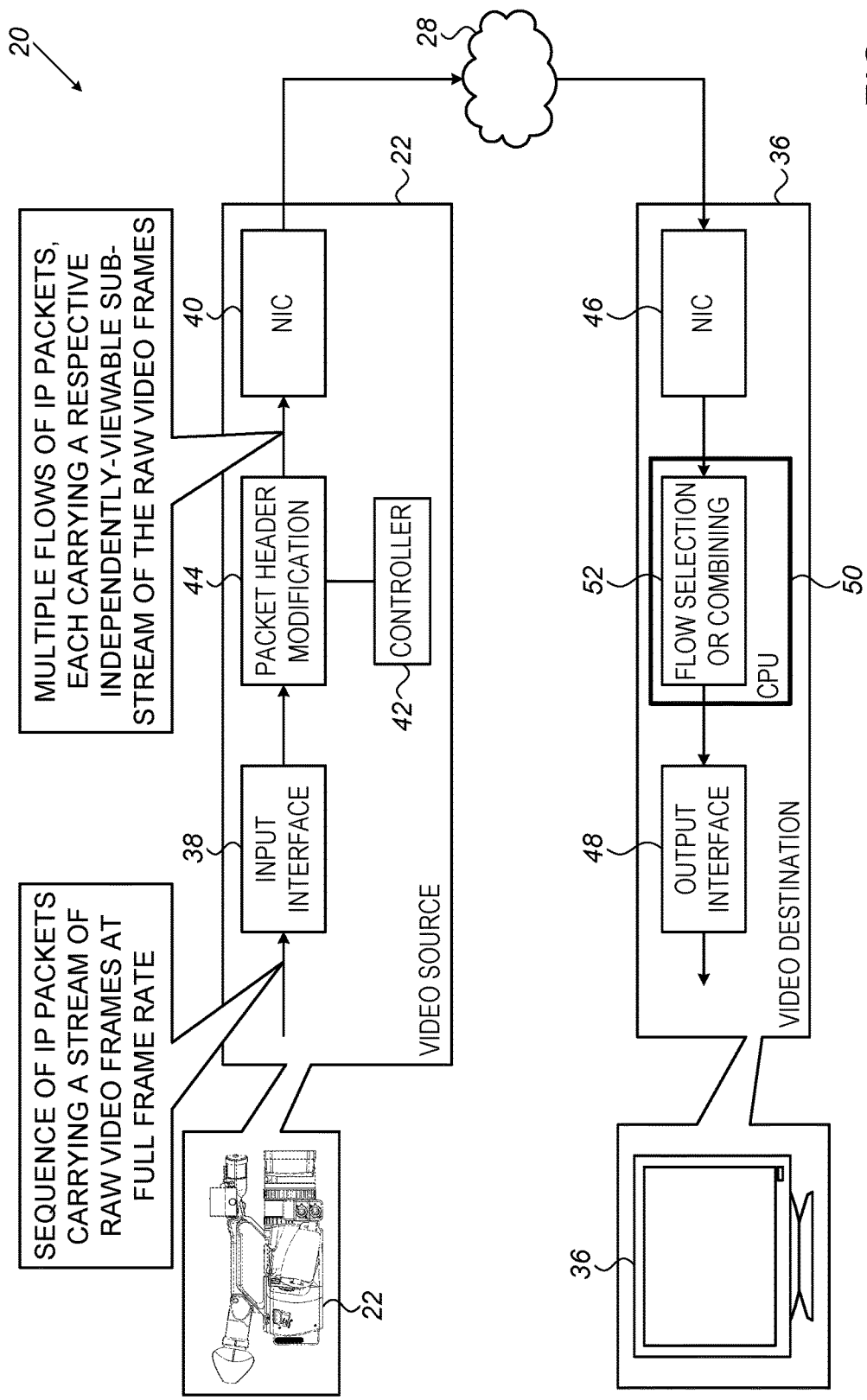
FIG. 1 is a block diagram that schematically illustrates a video transmission system, in accordance with an embodiment of the present invention.

FIG. 1 is a block diagram that schematically illustrates a video transmission system 20, in accordance with an embodiment of the present invention. Systems such as system 20 can be used, for example, in video streaming applications, television or video broadcast applications or other suitable application. The disclosed techniques can be used with any suitable video format. Example formats include Ultra-High Definition (UHD) television specified by the International Telecommunications Union (ITU), or the Society of Motion Picture and Television Engineers (SMPTE) standards ST2110-10, ST2110-20 and ST2110-21.

System 20 comprises a video source device 22, in the present example comprising a video camera, which produces a sequence of Internet Protocol (IP) packets that carries a stream of video frames. The video frames are raw, i.e., uncompressed. In other words, the actual values of the pixels of the video frames are transmitted without compression in the IP packets.

A transmit-side network adapter 40, also referred to as a transmit-side Network Interface Controller (NIC), connects video source 22 to a communication network 28. Among other tasks, video source 22 divides the sequence of packets into sub-sequences, and transmits each sub-sequence to network 28 on a different packet flow. In some embodiments, video source 22 also applies buffering and pacing to the sub-sequences of packets. These features are addressed in detail below.

In the present embodiment network 28 comprises an Ethernet network. Generally, however, network 28 may comprise any suitable type of network operating in accordance with any suitable communication standard or protocol.

On the receiving side, a video destination device 36, in the preset example a host computer, is configured to receive one or more of the packet flows transmitted by video source 22, and reconstruct a video stream from the flow or flows. Host computer 36 (referred to simply as "host" for brevity) outputs the reconstructed video stream to a suitable display device for displaying to a user. Additionally or alternatively, host 36 may store the reconstructed video stream, distribute or handle the video stream in any other suitable way. Host 36 may comprise, for example, a server or any other suitable platform.

In the example of FIG. 1, video source 22 comprises an input interface 38, NIC 40, a packet header modification module 44, and a controller 42. Input interface 38 receives the sequence of packets, which carries the original video stream, from camera 22. NIC 40 connects video source 22 to network 28. Packet header modification module 44 assigns the packets of the various packet sub-sequences to the appropriate packet flows, by inserting suitable attributes in the packet header fields. Controller 42 controls video source 22 and, among other tasks, configures module 44.

In the present example, host 36 (acting as the video destination) comprises a receive-side network adapter 46, also referred to as a receive-side NIC, a CPU 50, and an output interface 48. NIC 46 connects host 36 to network 28. Among other tasks, NIC 46 receives one or more of the packet flows transmitted by video source 22. CPU 50 carries out the various processing tasks of host 36.

Among other tasks, CPU 50 comprises a flow selection/combining module 52 that selects and/or combines selected packet flows, so as to reconstruct a video stream that is provided to output interface 48, for displaying on a display device. In other words, module 52 selects and/or combines selected video sub-streams of the original video stream, so as to produce a reconstructed video stream having a desired frame rate. Module 52 is typically implemented in software, but may, in some embodiments, be implemented in hardware or using a combination of software and hardware elements. Among other tasks, CPU 50 configures and controls module 52.

The system and NIC configurations of FIG. 1 are exemplary configurations that are shown purely for the sake of conceptual clarity. Any other suitable system and/or NIC configuration can be used in alternative embodiments. For example, in the system of FIG. 1, the video stream is produced by a video camera. In alternative embodiments, video streams can be produced by any other suitable video source, e.g., a video recorder, streamer or server. In the system of FIG. 1, the (one or more) received video sub-streams are provided as output to a video server. In alternative embodiments, video sub-streams may be provided to any other suitable video destination device, e.g., a video recorder.

In the example of FIG. 1, the division of the sequence of packets into sub-sequences, and the assignment of sub-sequences to packet flows, is performed in the video source, e.g., jointly by module 44 and NIC 40.

Alternatively, any of these functions may be performed in any other suitable system element. The system elements carrying out these functions are referred to herein collectively as "transmit-side circuitry."

Similarly, in the system of FIG. 1 the selection and/or combining of sub-streams is performed in the video destination device, e.g., in module 52. Alternatively, any of these functions may be performed in any other suitable system element. The system elements carrying out these functions are referred to herein collectively as "receive-side circuitry."

Figure 4:
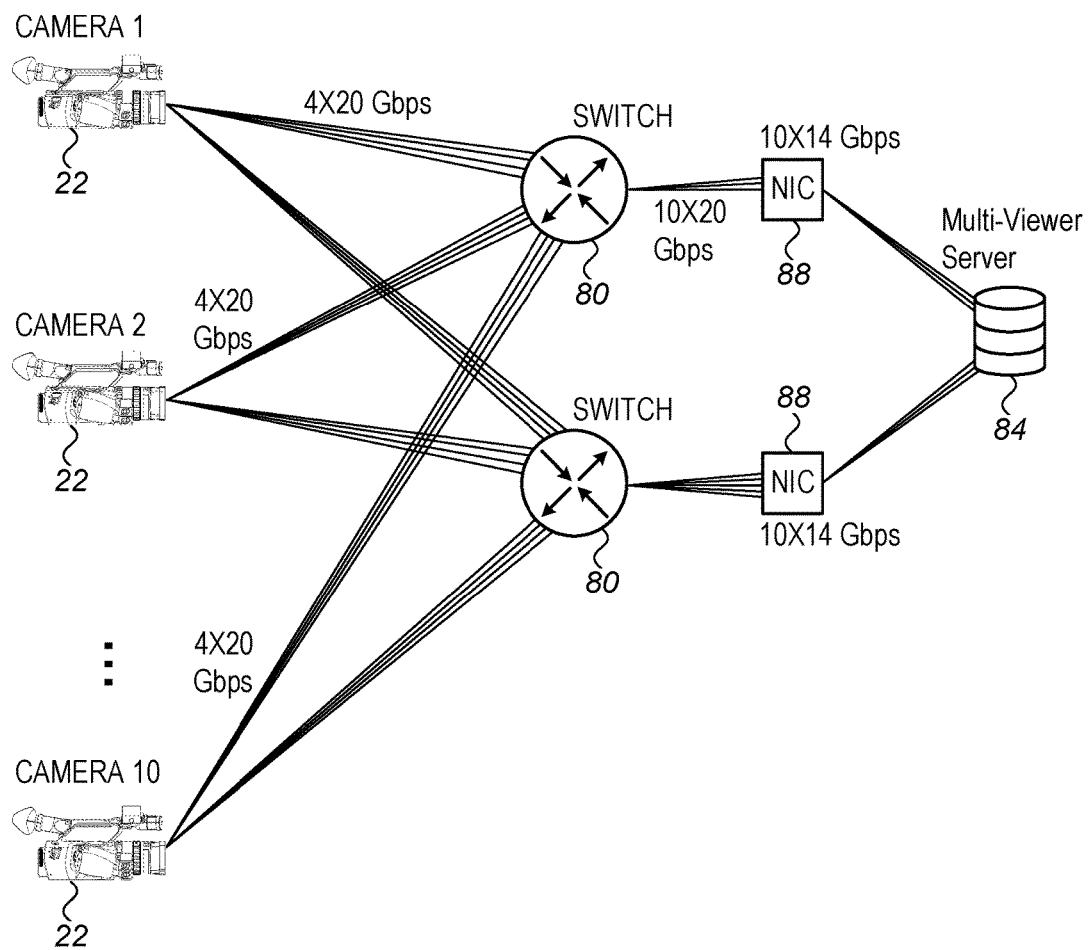
FIG. 4 is a block diagram that schematically illustrates a video transmission system, in accordance with another embodiment of the present invention.

The system of FIG. 1 shows a single video source and a single video destination, for the sake of clarity. In alternative embodiments, the disclosed techniques can be used in systems that comprise multiple video sources and/or multiple video destination device. One such embodiment is shown in FIG. 4 below.

In the embodiment of FIG. 1, network 28 comprises an Ethernet network, accessed by NICs 40 and 46. In alternative embodiments, network 28 may comprise any other suitable type of network or combination of networks. Depending on the underlying network protocol, the network adapters connected to the network may be referred to as NICs, Host Bus Adapters (HBAs) or Host Channel Adapters (HCA), for example.

Elements that are not necessary for understanding the principles of the disclosed techniques have been omitted from the figure for clarity.

The different elements of system 20 and its various components, such as the elements of video source 22 and video destination 36, may be implemented using any suitable hardware, such as in an Application-Specific Integrated Circuit (ASIC) or Field-Programmable Gate Array (FPGA). In some embodiments, some elements of video source 22 and/or video destination 36 can be implemented using software, or using a combination of hardware and software elements. In some embodiments, some elements of video source 22 and/or video destination 36 (e.g., controller 42 and/or CPU 50) may be implemented using one or more programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Example Sub-Stream Configurations

FIG. 2 is a diagram that schematically illustrates a video stream divided into sub-streams, in accordance with an embodiment of the present invention. In this figure, and in FIG. 3 below, the horizontal axis denotes time, and the vertical axis denotes bandwidth.

The top of FIG. 2 shows the original video stream produced by the video camera. The video stream comprises multiple video frames 60. In the present example, the frame rate of the original video stream is 120 frames per second (FPS), i.e., each frame 60 is approximately 8.33 mSec long.

The bottom of FIG. 2 shows how the video stream is divided into sub-streams by video source 22 (e.g., jointly by module 44 and NIC 40). In the present example video source 22 divides the original video stream into four sub-streams denoted 64A-64D. Each sub-stream comprises multiple video frames 68. Each frame 68 contains identical video content as a respective frame 60 in the original video stream. Frames 60 whose indices are 4$i$-3 ($i$=1, 2, 3, . . . ) are assigned to sub-stream 64A, frame indices 4$i$-2 are assigned to sub-stream 64B, frame indices 4$i$-1 are assigned to sub-stream 64C, and frame indices 4$i$ are assigned to sub-stream 64D.

In the example of FIG. 2, the four sub-streams are equal to one another in frame rate, and each of them is a quarter of the frame rate of the original video stream (i.e., 30 FPS each). Thus, each frame 68 (of the sub-streams) is transmitted over a time interval that is four times the time interval needed for the corresponding frame (of the original stream). As such, each sub-stream requires a quarter of the bandwidth required by the original video stream.

In some embodiments, video source 22 does not merely divide the original video stream into sub-streams, but also reduces the instantaneous bit-rate (and thus the bandwidth) of each sub-stream. In FIG. 2, for example, each frame 60 (of the original video stream) is approximately 8.33 mSec long. Each frame 68 (of the sub-streams), on the other hand, is approximately 4×8.3333.33 mSec long. This bit-rate reduction is referred to as "pacing". Pacing of a sub-stream is useful, for example, for reducing the burstiness of the sub-stream, and for making the sub-stream compliant with the relevant standard (e.g., ST2110-21).

In an example embodiment, the division of the packet sequence into sub-sequences mapped onto separate flows is performed by packet header modification module 44, and the pacing is performed by NIC 40. In other words, NIC 40 may offload the video source of the pacing task. Alternatively, any other suitable partitioning of tasks among the elements of video source 22 can be used.

The division shown in FIG. 2 is depicted purely by way of example. In alternative embodiments, video source 22 may divide the video stream into any suitable number of sub-streams, which need not necessarily be of the same frame rate.

FIG. 3 is a diagram that schematically illustrates another possible division of the original video stream into sub-streams, in accordance with an alternative embodiment of the present invention. In the example of FIG. 3, video source 22 divides the original video stream produced by the video camera into three sub-streams denoted 72A-72C, each comprising video frames 76.

In this embodiment, sub-streams 72A and 72C are equal to one another in frame rate, and each of them is a quarter of the frame rate of the original video stream (i.e., 30 FPS each). Sub-stream 72B, on the other hand, is twice the frame rate of the other sub-streams, or half the frame rate of the original video stream (i.e., 60 FPS).

In sub-streams 72A and 72C, each frame 76 is transmitted over a time interval that is four times the time interval needed for the corresponding frame 60 (of the original stream). As such, each of sub-streams 72A and 72C requires a quarter of the bandwidth required by the original video stream. In sub-stream 72B, on the other hand, each frame 76 is transmitted over a time interval that is twice the time interval needed for the corresponding frame 60 (of the original stream). Sub-stream 72B requires half the bandwidth required by the original video stream.

As can be seen in FIGS. 2 and 3, in the disclosed embodiments the sub-streams are interleaved with one another in time. Each sub-stream comprises video frames that span the same overall time period spanned by the original video stream, and convey similar video content, but at a fraction of the frame rate.

In the disclosed embodiments, each sub-sequence of packets (and thus each packet flow) carries a self-contained video stream, which is viewable independently of any other sub-stream. Moreover, in some embodiments any combination of sub-streams also forms a self-contained, independently-viewable video stream. The term "viewable" may mean, for example, that the video-sub-stream (or combination of sub-streams) is compliant with the video standard of the original video stream. For example, in some embodiments, if the original video stream complies with SMPTE standards ST2110-10, ST2110-20 and ST2110-21, each sub-stream or combination of sub-streams complies with these standards, as well.

The sub-stream configurations of FIGS. 2 and 3 are depicted purely by way of example. In alternative embodiments, video source 22 may divide the original video stream into sub-stream in any suitable manner. For example, it is not mandatory to alternate between sub-streams on every frame. Another possible division is, for example, to assign frames 1&2 to one sub-stream, assign frames 3&4 to the next sub-stream, then assign frames 5&6 to the next sub-stream, and so on. Any other suitable partitioning scheme can also be used. Moreover, in some embodiments, not all sub-streams need necessarily be self-contained, independently-viewable video streams.

Transmission with Scalable Video Frame Rate

In some embodiments, the video camera sends the original video stream in a sequence of IP packets. Each video frame typically spans multiple successive packets. For high-definition video, a single video frame typically spans several thousand or tens of thousands of packets. In example embodiments, each video frame comprises thousands of pixels per dimension (e.g., 4096-by-2160 pixels per frame in the DCI 4K standard, or 3840-by-2160 pixels per frame in the UHDTV standard). Each pixel may be represented, for example, by several "channels", each represented by eight, ten, twelve or sixteen bits. The frame rate of the original video stream may be, for example, up to 120 FPS.

Video source 22 typically divides the video stream into multiple sub-streams by assigning the packets of each sub-stream to a different packet flow. Each packet flow is defined by a set of field values (a "tuple") in the packet header, such as destination IP address and port number. In an embodiment, this action is performed by packet header modification module 44 in video source 22. Module 44 receives the sequence of packets from input interface 38. For each packet, module 44 decides to which flow to assign the packet, and inserts the field values of that flow into the packet header.

Thus, the packet sequence at the output of module 44 has the same frame rate and the same frame order as the packet sequence at the input of module 44. Logically, however, the packets are assigned to multiple different flows. When transmitted to network 28, each sub-sequence of packets (which corresponding to a respective flow and carries a respective video sub-stream) will be processed separately by the network elements (e.g., network switches) en-route to the video destination.

In some embodiments, the entire packet sequence, including all flows, is transmitted from NIC 40 over a single port. In other embodiments, the different flows may be transmitted from NIC 40 over two or more ports. In an embodiment, controller 42 configures module 44 with the desired number of flows to generate and their parameters.

Reception with Scalable Video Frame Rate

When using the transmission scheme described above, the video stream produced by the video camera is transmitted over network 28 in a plurality of packet flows. Each packet flow carries a respective video sub-stream, which has a fraction of the frame rate of the original video stream.

In some embodiments, host 36 reconstructs a video stream having a desired frame rate from one or more of the packet flows, and outputs the reconstructed video stream over output interface 48. This action is typically performed by flow selection/combining module 52.

Referring to the example of FIG. 2, module 52 may reconstruct a video stream having a frame rate of 25%, 50%, 75% or 100% of the frame rate of the original video stream (30, 60, 90 and 120 FPS, respectively). A frame rate of 25% is achieved by selecting any one of sub-streams 64A-64D. A frame rate of 50% is achieved by selecting and merging two sub-streams, e.g., sub-streams 64A and 64C, or sub-streams 64B and 64D. A frame rate of 100% is achieved by selecting and merging all four sub-streams.

Referring to the example of FIG. 3, module 52 may also reconstruct a video stream having a frame rate of 25%, 50%, 75% or 100% of the frame rate of the original video stream. A frame rate of 25% is achieved by selecting either sub-stream 72A or sub-stream 72C. A frame rate of 50% is achieved by selecting sub-stream 72B. A frame rate of 100% is achieved by selecting and merging all three sub-streams.

Although the achievable set of frame rates is the same in the configurations of FIGS. 2 and 3, the configuration of FIG. 3 has reduced end-to-end latency.

In some embodiments, all flows are received in NIC 46 over a single port. In other embodiments, the different flows may be received in NIC 46 over two or more ports. In yet other embodiments, as will be shown in FIG. 4 below, the different flows may be received in the video destination device via two or more NICs.

In an embodiment, CPU 50 configures module 52 with the desired number of flows to select and their parameters. This decision may depend on any suitable criterion, e.g., based on the processing capabilities or bandwidth of NIC 46 and/or host 36.

Multi-Viewer Application Example

FIG. 4 is a block diagram that schematically illustrates a video transmission system, in accordance with another embodiment of the present invention. In the present example, the system comprises ten cameras 22. Each camera produces a video stream that is divided into four sub-streams, which are in turn transmitted over four 20 Gbps flows. Each camera broadcasts the four flows to two network switches 80.

Each network switch 80 sends the video streams received from cameras 22 to a respective NIC 88. The two NICs 88 are used for connecting a multi-viewer server 84 to the network. The flows from each switch 80 are transported over ten 20 Gbps links. Each NIC 88 is capable of processing up to ten 14 Gbps flows. In some embodiments, each NIC can subscribe to one or more desired flows, i.e., request the network to provide only the selected flow. This request may be sent, for example, using the "join" command of the Internet Group Management Protocol (IGMP).

Although the embodiments described herein mainly address video production and broadcasting applications, the methods and systems described herein can also be used in other applications that involve video transmission, such as video-based manufacturing control applications, border control applications and computer vision applications, to name just a few examples.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
an input interface, configured to receive a sequence of packets that carries a stream of video frames; and
transmit-side circuitry, which is configured to:
divide the sequence of packets into multiple interleaved sub-sequences, wherein each sub-sequence carries a respective sub-stream of the stream of video frames, and wherein at least one of the sub-streams is self-contained and viewable independently of any other sub-stream;
convert the multiple sub-sequences into multiple respective paced sub-sequences of packets, wherein each paced sub-sequence is identical in video content to the corresponding sub-sequence, but is longer in duration and has a smaller instantaneous bit-rate than the corresponding sub-sequence; and
transmit the multiple paced sub-sequences of packets to a communication network over respective, different packet flows.

2. The apparatus according to claim 1, wherein the video frames are uncompressed.

3. The apparatus according to claim 1, wherein each of the sub-streams is self-contained and viewable independently of any other sub-stream.

4. The apparatus according to claim 1, wherein at least one combination of two or more of the sub-streams is self-contained and viewable independently of any other sub-stream.

5. The apparatus according to claim 1, wherein the transmit-side circuitry is configured to divide the sequence of packets into the sub-sequences, and assign the packets to the packet flows, by inserting attributes of the packet flows in header fields of the packets.

6. The apparatus according to claim 1, wherein the transmit-side circuitry is configured to set different frame rates to two or more of the sub-streams.

7. A method, comprising:
receiving a sequence of packets that carries a stream of video frames;
dividing the sequence of packets into multiple interleaved sub-sequences, wherein each sub-sequence carries a respective sub-stream of the stream of video frames, and wherein at least one of the sub-streams is self-contained and viewable independently of any other sub-stream; and
converting the multiple sub-sequences into multiple respective paced sub-sequences of packets, wherein each paced sub-sequence is identical in video content to the corresponding sub-sequence, but is longer in duration and has a smaller instantaneous bit-rate than the corresponding sub-sequence; and
transmitting the multiple paced sub-sequences of packets to a communication network over respective, different packet flows.

8. The method according to claim 7, wherein the video frames are uncompressed.

9. The method according to claim 7, wherein each of the sub-streams is self-contained and viewable independently of any other sub-stream.

10. The method according to claim 7, wherein at least one combination of two or more of the sub-streams is self-contained and viewable independently of any other sub-stream.

11. The method according to claim 7, wherein dividing the sequence of packets into the sub-sequences comprises assigning the packets to the packet flows by inserting attributes of the packet flows in header fields of the packets.

12. The method according to claim 7, wherein dividing the sequence of packets into the sub-sequences comprises setting different frame rates to two or more of the sub-streams.

* * * * *